United States Patent
Zhang et al.

(10) Patent No.: US 8,781,305 B2
(45) Date of Patent: Jul. 15, 2014

(54) MEDIA STREAMING WITH SMOOTH FAST-FORWARD AND REWIND

(75) Inventors: Wenbo Zhang, Redmond, WA (US); Gurpratap Virdi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 12/326,839

(22) Filed: Dec. 2, 2008

(65) Prior Publication Data

US 2010/0135636 A1 Jun. 3, 2010

(51) Int. Cl.
- *H04N 9/80* (2006.01)
- *H04N 5/783* (2006.01)
- *H04N 21/6587* (2011.01)
- *H04N 21/472* (2011.01)
- *H04N 21/2387* (2011.01)

(52) U.S. Cl.
CPC .......... *H04N 5/783* (2013.01); *H04N 21/6587* (2013.01); *H04N 21/2387* (2013.01); *H04N 21/47217* (2013.01)
USPC .............................. 386/343; 725/90; 725/88

(58) Field of Classification Search
CPC .. H04N 21/60; H04N 21/6587; H04N 21/658
USPC ....................................... 386/343; 725/90, 95
See application file for complete search history.

(56) References Cited

U.S. PATENT DOCUMENTS

| | | | |
|---|---|---|---|
| 6,693,959 B1 | 2/2004 | Eckart et al. | |
| 6,738,980 B2 | 5/2004 | Lin et al. | |
| 6,965,724 B1 * | 11/2005 | Boccon-Gibod et al. | 386/344 |
| 7,525,965 B1 * | 4/2009 | St. Pierre et al. | 370/390 |
| 7,739,715 B2 * | 6/2010 | He et al. | 725/90 |
| 2004/0267952 A1 * | 12/2004 | He et al. | 709/231 |
| 2004/0268397 A1 | 12/2004 | Dunbar et al. | |
| 2005/0135783 A1 | 6/2005 | Crinon | |
| 2006/0090009 A1 * | 4/2006 | Gopalakrishnan et al. | 709/246 |
| 2007/0094405 A1 | 4/2007 | Zhang | |
| 2007/0162568 A1 | 7/2007 | Gupta et al. | |
| 2008/0022005 A1 | 1/2008 | Wu et al. | |
| 2008/0212775 A1 | 9/2008 | Mirsky et al. | |
| 2009/0300145 A1 * | 12/2009 | Musayev et al. | 709/219 |
| 2010/0235542 A1 * | 9/2010 | Visharam et al. | 709/246 |

OTHER PUBLICATIONS

"Enhanced Trick Mode", Retrieved at <<http://technet.microsoil.com/en-us/library/cc731723.aspx>>, Oct. 13, 2008, pp. 1-2.
"Streaming Server", Retrieved at <<http://www.quadplaymedia.tv/pdf/streaming.pdf>>, p. 1.

* cited by examiner

*Primary Examiner* — Thai Tran
*Assistant Examiner* — Girumsew Wendmagegn
(74) *Attorney, Agent, or Firm* — Micah Goldsmith; Glen Johnson; Micky Minhas

(57) ABSTRACT

Media streaming with smooth fast-forward and rewind is disclosed. One embodiment receives a media stream encoded at a first bit rate over a network connection, and in response to an input to fast-forward or rewind the media stream, the media stream may be retrieved at a second bit rate, and rendered at the second bit rate for fast-forward or rewind playback. By receiving the media stream at multiple bit rates, a media stream may be rendered at increased forward or reverse speeds without dropping frames in the media stream.

20 Claims, 4 Drawing Sheets

MEDIA STREAMING WITH SMOOTH FAST-FORWARD AND REWIND

BACKGROUND

When streaming media content from an Internet download server, a viewer may want to fast-forward or rewind video content. Solutions for fast-forwarding include downloading video content at a faster rate than playback speed; however, this solution involves increasing network bandwidth if the viewer wants to see all the frames in a media stream at the fast-forward rate. For example, when fast-forwarding at 8 times playback speed, a client device would use 8 times the bandwidth compared with normal playback in order to include all the frames in the media stream. Another solution involves downloading the full content of a media stream before fast-forwarding; consuming more memory in a playback device to hold the content while also increasing the start-up delay for the content to be downloaded before fast-forwarding can begin.

Additionally, solutions for fast rewinding include sending byte-range seeks to decoding boundaries and then downloading a portion of content from a previous decoding boundary, since decoders currently do not decode video content in a reverse order. Unfortunately, this solution is server dependent and not all Internet download servers and proxy server support such byte-range seek requests for the http protocol. Additionally, solutions may involve downloading the full content of a media stream before fast rewinding and consequently consuming more memory to hold the content as well as increasing the start-up delay for the content to download before fast rewinding.

SUMMARY

Accordingly, various embodiments for media streaming with smooth fast-forward and rewind are described below in the Detailed Description. For example, one embodiment receives a media stream encoded at a first bit rate over a network connection, and in response to an input to fast-forward or rewind the media stream, the media stream may be retrieved at a second bit rate, and rendered at the second bit rate for fast-forward or rewind playback. By being able to receive a media stream at multiple bit rates, the media stream may be smoothly rendered at increased fast-forward or rewind playback speeds or otherwise adjusted for playback performance.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
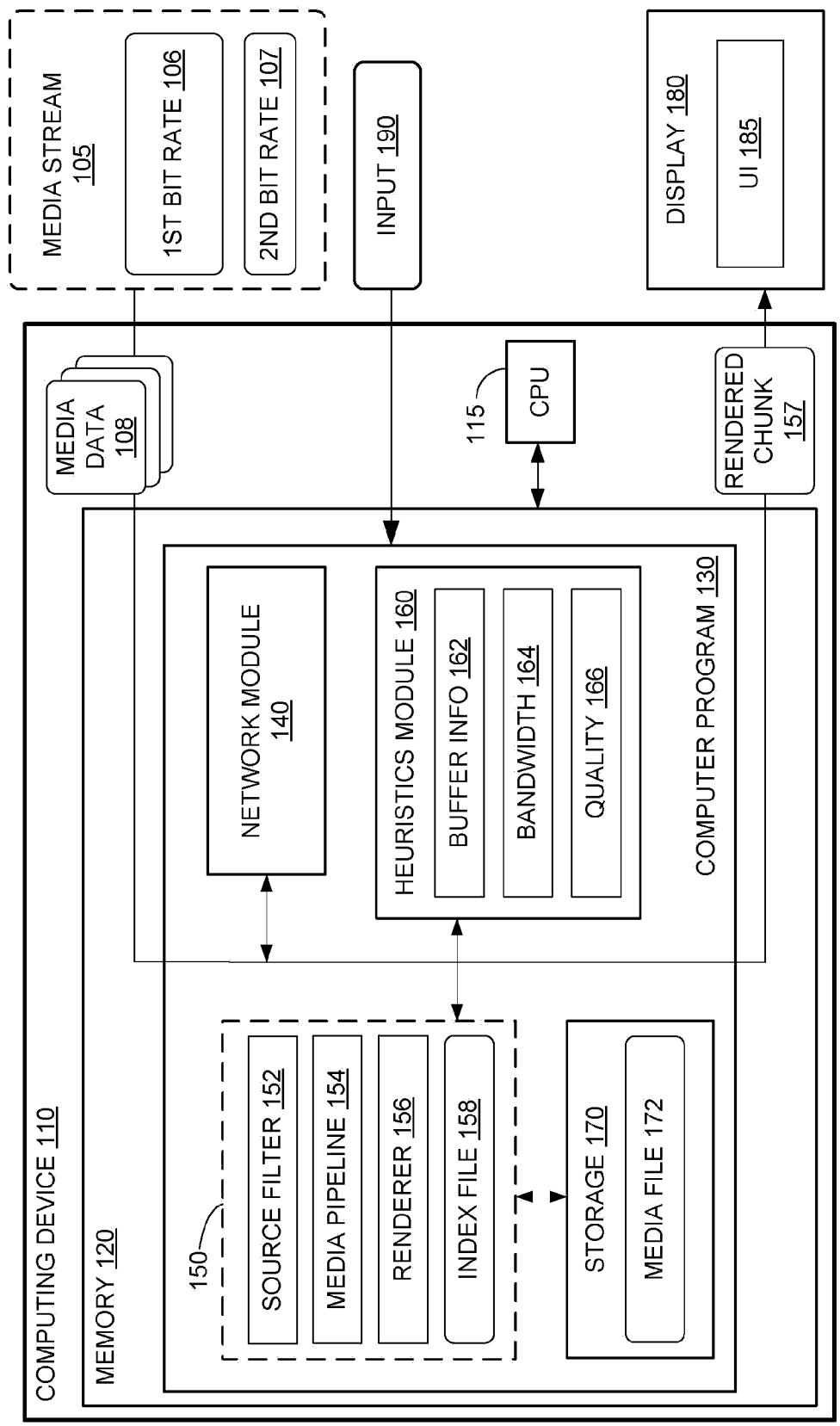
FIG. 1 shows an embodiment device providing media streaming with a smooth fast-forward and rewind.

FIG. 1 shows a system 100 including an embodiment computing device 110, or playback device, to receive a media stream 105 at a first bit rate 106, and to provide a smooth fast-forward or rewind by retrieving and rendering the media stream at a second bit rate 107 during fast-forwarding and rewinding operations. The computing device 110 depicted in FIG. 1 receives media data 108 segments of a media stream 105 in "chunks" having a similar playback duration but multiple bit rate (MBR) streams, in turn allowing bit rate adjustments of the media stream 105 to provide smooth fast-forwarding or rewinding, as explained in more detail in the following paragraphs.

In some embodiments, media stream 105 may be segmented into a plurality of bit rates. For example, the media stream 105 may be divided into chunks having 12 different intermediate bit rates, with the chunks further comprising shared durations to allow a playback device to switch between the chunks at different bit rates in order to provide a smooth fast-forward and rewind. In this way, computing device 110 can selectively download appropriate video chunks according to network bandwidth, fast-forwarding/rewinding speed, and other factors influencing playback performance, to allow smooth fast-forward and rewind of a media stream. Other embodiments are not so limited, and may provide smooth fast-forward and rewind using other bit rate adjustments of a media stream.

With reference to the embodiment illustrated in FIG. 1 in more detail, computing device 110 includes a processor 115, a memory 120, and a computer program 130 in memory 120. Computer program includes a network module 140 to receive media data 108, a heuristics module 160 to monitor factors impacting playback performance and select an appropriate bit rate to receive media data, a platform module 150 to receive the media data and render it for display, and a storage 170 to store a media file 172 for a subsequent playback. System 100 further includes a display 180 having a user interface 185. Display 180 may be connected to, in communication with, or a part of computing device 110.

Platform module 150 includes a source filter 152, a media pipeline 154, a renderer 156, and an index file 158. Other embodiments may contain different elements than platform module 150, fewer elements than platform module 150, etc., may exist in more computer program, be in a distributed network of functional modules, etc. Platform module 150 is in communication with storage 170, allowing storage of a media file 172, or other media data, for subsequent playback.

In some embodiments, a media stream 105 may be segmented into independently decodable chunks of media data and attributes of the chunks and media data may be stored in index file 158, an example of which will be described below in more detail. In this way, a playback device may monitor factors impacting playback performance and depending on relevant factors, may select an appropriate bit rate to retrieve of the media stream 105 in order to provide a rendered chunk 157 of the media stream 105 allowing for smooth fast-forward or rewind operations.

In illustrated example, playback performance may be monitored by heuristics module 160, including buffer information 162 (buffer fullness, fill rate, etc.), bandwidth 164 (network connection bandwidth, device playback capability, etc.), media stream quality 166, or other factors that may impact playback performance while fast-forwarding or rewinding, preparing to fast-forward or rewind, etc. For example, heuristics module 160 may be configured to dynamically monitor playback performance of the computing device based on at least one of a receive buffer fullness, network bandwidth, computing device bandwidth, or media stream quality, wherein the platform module is configured to render the media stream for smooth fast-forward or rewind playback at a supported bit rate in the index file in response to a command from the heuristics module.

In some embodiments, if playback performance does not support a smooth fast-forward or rewind at a bit rate as measured by heuristics module 160, the platform module 150 may be configured to retrieve a portion of the frames in the media stream and to render the media stream for smooth fast-forward or rewind playback using the portion of frames.

In an example embodiment, index file 158 may contain attributes of a plurality of media chunks in a media stream encoded at a plurality of bit rates including a first bit rate 106 and a second bit rate 107, with each media chunk having a similar playback duration. Network module 140 receives the media stream 105 encoded at the first bit rate over a network connection, and platform module 150 then receives the media stream 105 from network module 140. Therefore, in response to a fast-forward or rewind input 190 for the media stream, the platform module 150 may retrieve the media stream encoded at a second bit rate 107 and then render the media stream 105 for smooth fast-forward or rewind playback at the second bit rate 107. This provides more control for a playback device, for example, a playback device may provide fast-rewind functionality without depending on byte-range seek support from an Internet download server, as an example.

In some embodiments, the platform module is configured to ramp the bit rate of the media stream 105 to an intermediate bit rate, and render the media stream 105 at the intermediate bit rate for smooth fast-forward or rewind playback. Further, this approach allows a playback device to scale to a relatively low bit rate and render fast-forward or rewind content with little latency, wherein the playback device still may scale the bit rate according to what is supported by current conditions.

In the present example, by using chunks of a similar playback duration but having different bit rates, it allows a playback device to interchangeably use chunks of a lower bit rate when downloading at different fast-forward or rewind speeds. For example, a playback device may fast-forward at a 4× speed by selecting an intermediate bit rate that is $1/4^{th}$ of a playback bit rate for a media stream, while substantially maintaining a download bandwidth, a processing budget, etc.

In some embodiments, if a fast-forward or rewind speed exceeds playback performance limitations, a sub-set of chunks, frames, may be retrieved and rendered, as described below in more detail. As an example, if a person selects a fast-forward at 8× a playback bit rate and it is not supported by the playback device, the network connection bandwidth, as determined by the heuristics module 160, then the platform module may select intra-coded frames such as I-frames, or I-frames and a subset of inter-coded frames, such as P-frames but not B-frames. Other combinations of frames may be used to maintain a sufficient fast-forward or rewind experience while eliminating frames that least impact a smooth fast-forward or rewind at the playback device.

Additionally, in embodiments that use independently decodable chunks of the media stream, a subset of the total number of chunks may also be used to provide a smooth fast-forward or rewind experience. Other embodiments may use combinations of these approaches, or include other improvements. An example embodiment with a combination of approaches is described in more detail below with reference to FIG. 4.

An example index file 158 can have separate sections for video and audio media data and describe different bit rates available to retrieve over a network connection and may include an address (e.g., a URL) for where to obtain media data having specific bit rates. An example index file 158 may include URLs, the duration of the content segments, quality information, a size of the files to retrieve, a number of content segments or "chunks" that a file is fragmented into, position in time of the content segments, media attributes, etc. This example index file includes information about time-varying properties of one or more encoded media streams. An example index file is as follows:

```
<MediaIndex MajorVersion="0" MinorVersion="3">
<Attribute Name="XCP_MS_UINT64_DURATION_HNS" Value="1169500000"/>
<StreamIndex Type="Video" SubType="WVC1"
Url="mbr/JennaEasyHD_1280x720_30fps_{1}_{0}.vid" Chunks="62"
Bitrates="12">
<Bitrate n="0" Kbps="3960" w="1280" h="720"/>
<Bitrate n="1" Kbps="2083" w="1280" h="720"/>
<Bitrate n="2" Kbps="1813" w="1280" h="720"/>
<Bitrate n="3" Kbps="1564" w="1280" h="720"/>
<Bitrate n="4" Kbps="1396" w="1280" h="720"/>
<Bitrate n="5" Kbps="1140" w="1280" h="720"/>
<Bitrate n="6" Kbps="925" w="600" h="400"/>
<Bitrate n="7" Kbps="781" w="600" h="400"/>
<Bitrate n="8" Kbps="597" w="600" h="400"/>
<Bitrate n="9" Kbps="455" w="600" h="400"/>
<Bitrate n="10" Kbps="349" w="600" h="400"/>
<Bitrate n="11" Kbps="249" w="600" h="400"/>
<Attribute Name="XCP_MS_UINT32_4CC" Value="WVC1"/>
<Attribute Name="XCP_MS_UINT32_WIDTH" Value="1280"/>
<Attribute Name="XCP_MS_UINT32_HEIGHT" Value="720"/>
<Attribute Name="XCP_MS_BLOB_VIDEO_CODEC"
Value="250000010fd3fe27f1678a27f859f180c8800000010e5a0040"/>
<c n="0" d="20020000"><f n="0" s="839" q="4930"/><f n="1" s="413"
q="2421"/><f n="2" s="367" q="2148"/><f n="3" s="322" q="1885"/><f n="4"
s="290" q="1696"/><f n="5" s="232" q="1355"/><f n="6" s="184" q="1076"/><f
n="7" s="164" q="953"/><f n="8" s="124" q="721"/><f n="9" s="99" q="575"/><f
n="10" s="79" q="454"/><f n="11" s="58" q="334"/></c>
```

-continued

```
<c n="1" d="22020000"><f n="0" s="837" q="4761"/><f n="1" s="435"
q="2469"/><f n="2" s="397" q="2255"/><f n="3" s="342" q="1941"/><f n="4"
s="308" q="1748"/><f n="5" s="251" q="1422"/><f n="6" s="194" q="1099"/><f
n="7" s="168" q="946"/><f n="8" s="131" q="731"/><f n="9" s="108" q="605"/><f
n="10" s="88" q="494"/><f n="11" s="65" q="359"/></c>
```

In this example, a media stream can be divided into chunks using index file 158, as a non-limiting example, the media stream can be segmented into 2-5 seconds chunks at multiple bit rates. Chunks may be physically divided segments, virtually divided segments (in the case of a continuous stream), etc. In some embodiments, the quality and bit rate of a media stream can be reevaluated to provide a fast-forward or rewind of the media stream at a supported bit rate.

In the example index file above, the designation of "bit rates" refers to the bit rates available for a media stream. Additionally, "attribute" names provide information that may be used by a decoder or a media pipeline to decode a media stream, as one example the attributes may be initialization information for the decoder. Further, an index file may have different sections for "video" and "audio" media data to allow an independent description of each type of chunk of media data.

In the present example index file, the designation of "n=" refers to a chunk number while the designation of "d=" following each chunk number refers to the duration of each respective chunk. As can be seen, the chunks have similar playback duration and may be approximately equal in length. Other characteristics of a media stream can easily be inserted into an index file, such as a size of files associated with specific chunks or a duration of an entire media segment.

The illustrated index file is an example and a portion of the data elements in the index file or additional information not included in the index file may be used according to the principles of this disclosure. As an example, additional information may include a designation "s=", which can be a size of each chunk. The "q" designation in the present index file may represent each chunk's average quality, for example, as calculated during encoding.

In the index file above, a higher quality number generally means less information is lost due to video compression. In this way, the heuristics module 160 may make a determination based on a number of factors, such as empirical data of the playback, regarding which bit rate to choose. Quality levels may also be considered in deciding which bit rate to choose to retrieve. In this way, quality information allows intelligent decisions about accepting lower bit rates for low quality content in order to reserve bandwidth for higher bit rates and higher quality content. For example, low bit rates can be used for dark scenes that have little motion where there is little difference between content of different qualities and higher bit rates may be used for scenes that are complex with a lot of motion.

In some embodiments, an index file may be represented as an XML file with a specific schema, potentially, with an encoding to hide clear text. Additionally, the index file may contain media level attributes (e.g. total playback duration), and a description of individual streams. Further, stream descriptions can include media stream-specific information, such as type of the stream (e.g. video, audio), encoding and other codec information (e.g. fourCC code, width, height), available bit rates, and information on individual media segment represented by chunks of different available bit rates (e.g. segment duration, chunk sizes). Also, a stream description may include information that allows production of individual chunk URLs for download, which in turn may be a text pattern including calculated fields based on chunk number, chunk bit rate, chunk stream and stream type.

Figure 2:
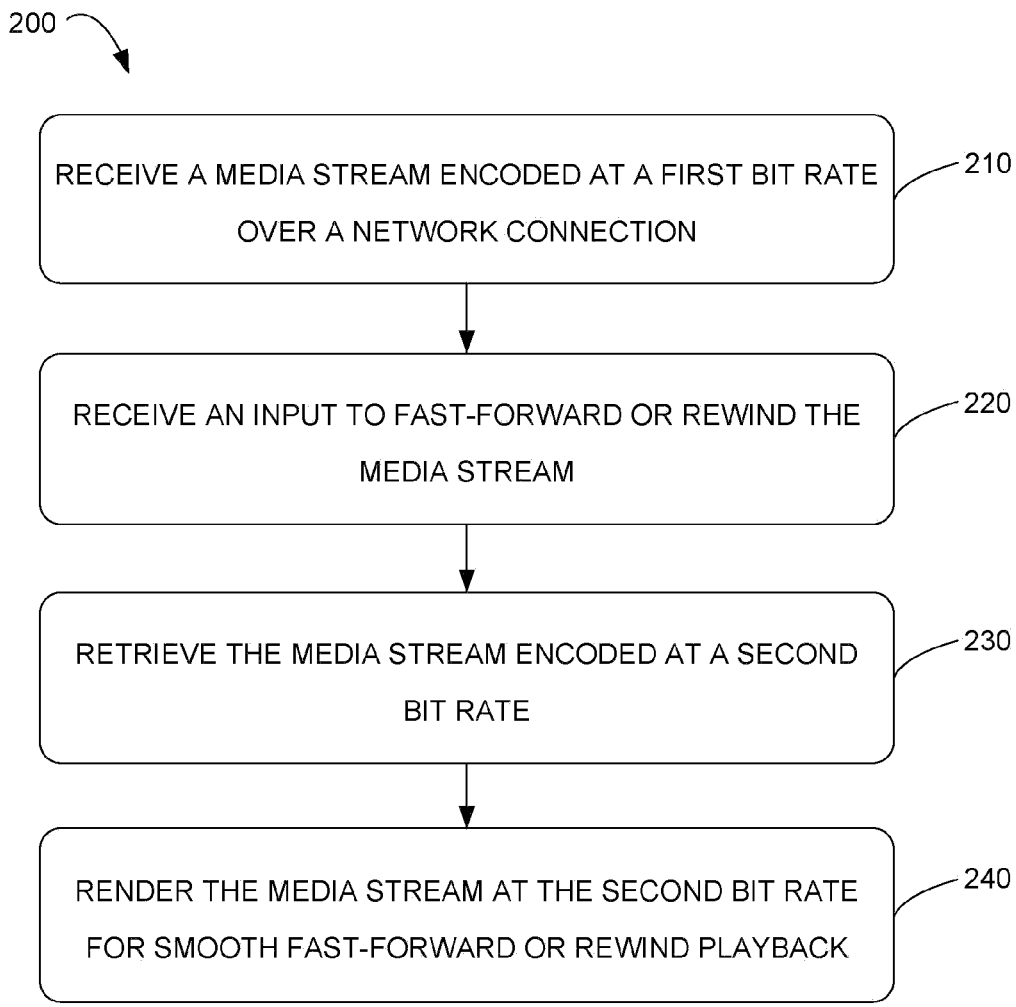
FIG. 2 shows a process flow depicting an embodiment of a client side method for media streaming with smooth fast-forward and rewind.

FIG. 2 shows a process flow depicting an embodiment of a client side method 200 for media streaming with smooth fast-forward and rewind. First, as indicated in block 210, method 200 comprises receiving a media stream encoded at a first bit rate over a network connection. This may comprise the media stream being encoded in a plurality of independently decodable chunks in at least the first bit rate and a second bit rate, for example each of the plurality of chunks may have a similar playback duration.

Method 200 also comprises receiving an input to fast-forward or rewind the media stream as indicated in block 220. Next, method 200 comprises retrieving the media stream encoded at a second bit rate, as indicated at 230.

Method 200 then comprises rendering the media stream at the second bit rate for smooth fast-forward or rewind playback, as indicated in block 240. In some embodiments, method 200 may further comprise receiving an index file containing attributes of a plurality of chunks encoded at a plurality of bit rates, monitoring the performance of the network connection, and retrieving the media stream encoded at a supported bit rate, wherein the supported bit rate is the highest supported bit rate in the index file. In this way, the method may render the media stream for smooth fast-forward or rewind playback at the highest supported bit rate. In some embodiments, method 200 may further comprise ramping the bit rate of the media stream to an intermediate bit rate, and rendering the media stream at the intermediate bit rate for smooth fast-forward or rewind playback.

In some embodiments, method 200 may further comprise monitoring performance data for the network connection, and rendering the media stream at a bit rate supported by the network connection. In an example, an embodiment may receive an input for a fast-forward or rewind playback speed, and render the media stream for smooth fast-forward or rewind playback at the playback speed at a bit rate supported by the network connection. In some embodiments, if the performance of a playback device does not support a smooth fast-forward or rewind at the second bit rate, the method may further comprise rendering a portion of the frames in the media stream. In another approach, method 200 may comprise rendering a portion of the chunks in the media stream at the second bit rate for smooth fast-forward or rewind playback. In some embodiments, method 200 may further comprise setting a download bandwidth threshold on the media stream, and retrieving the media stream at or below the download threshold bandwidth.

Figure 3:
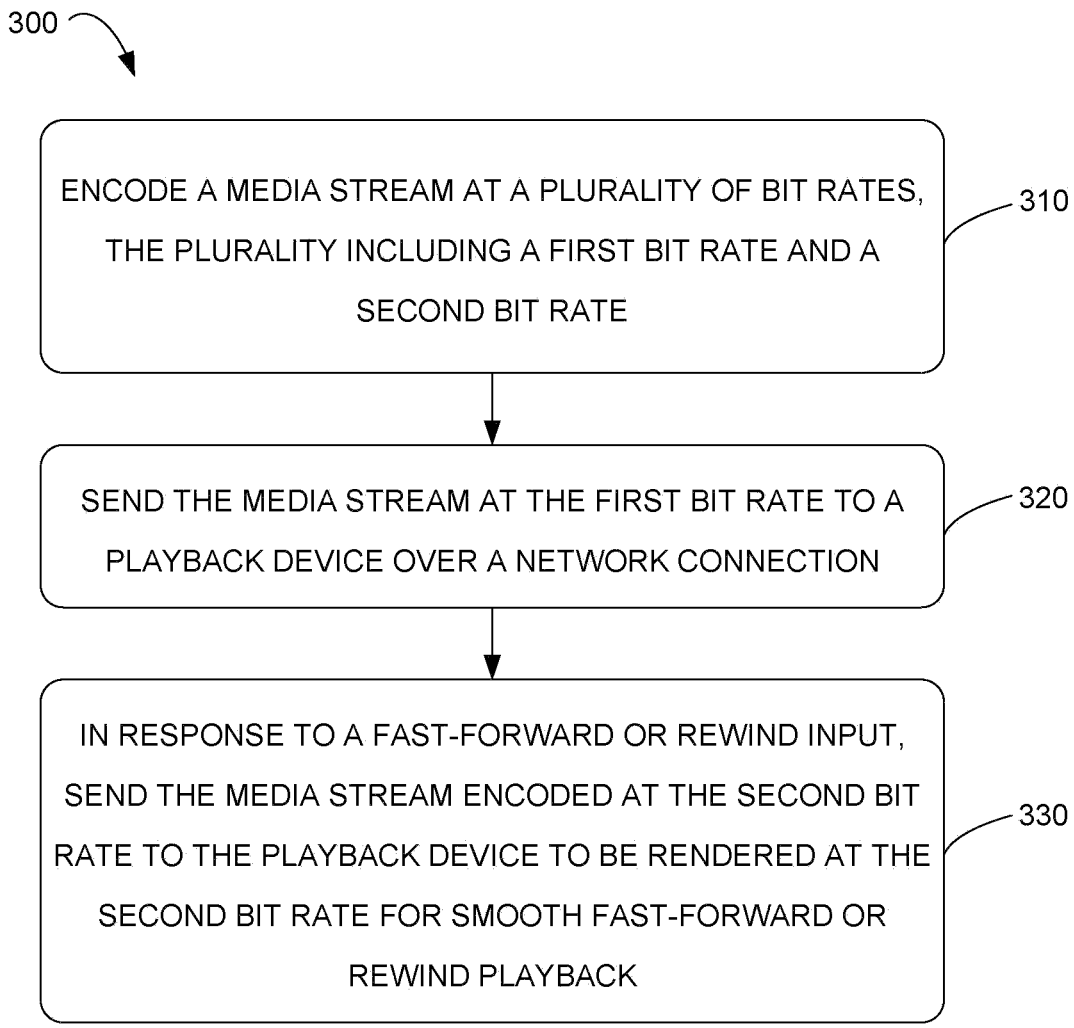
FIG. 3 shows a process flow depicting an embodiment of a server side method to provide media streaming with smooth fast-forward and rewind.

FIG. 3 shows a process flow depicting an embodiment of a server side method 300 to provide media streaming with smooth fast-forward and rewind. First, as indicated in block 310, method 300 comprises encoding a media stream at a plurality of bit rates, the plurality including a first bit rate and a second bit rate.

Method 300 also comprises sending the media stream at the first bit rate to a playback device over a network connection, as indicated in block 320. Next, method 300 comprises sending the media stream encoded at the second bit rate to the playback device to be rendered at the second bit rate for smooth fast-forward or rewind playback in response to a fast-forward or rewind input, as indicated at 330.

In some embodiments, method 300 may further comprise ramping the bit rate of the media stream to an intermediate bit rate, and sending the media stream to the playback device at the intermediate bit rate for smooth fast-forward or rewind playback. In yet another embodiment, method 300 may further comprise receiving information from the playback device related to performance of the network connection or of the playback device, and sending the media stream at a bit rate supported by the network connection or playback device. In this way, if the performance of the network connection or playback device does not support a smooth fast-forward or rewind at the second bit rate, the method may further comprise sending a portion of the frames in the media stream to the playback device. In another example, an embodiment may receive an input from a playback device for a fast-forward or rewind playback speed, and render a media stream for smooth fast-forward or rewind playback at the playback speed at a bit rate supported by the network connection.

In some embodiments, method 300 may encode the media stream in a plurality of independently decodable chunks in at least the first bit rate and the second bit rate, for example, each of the plurality of chunks may have a similar playback duration. In some cases if a bit rate is not supported or if there are other playback performance constraints, the method 300 may further comprise sending a portion of the chunks in the media stream to the playback device for smooth fast-forward or rewind playback. In some embodiments, method 300 may further comprise setting a download bandwidth threshold on the media stream, and sending the media stream to a playback device at or below the download threshold bandwidth.

In yet another embodiment, method 300 may further comprise generating an index file containing attributes of a plurality of chunks encoded at a plurality of bit rates, receiving information from the playback device related to performance of the network connection, and sending the media stream encoded at a supported bit rate to the playback device for smooth fast-forward or rewind playback, wherein the supported bit rate is the highest supported bit rate in the index file.

Figure 4:
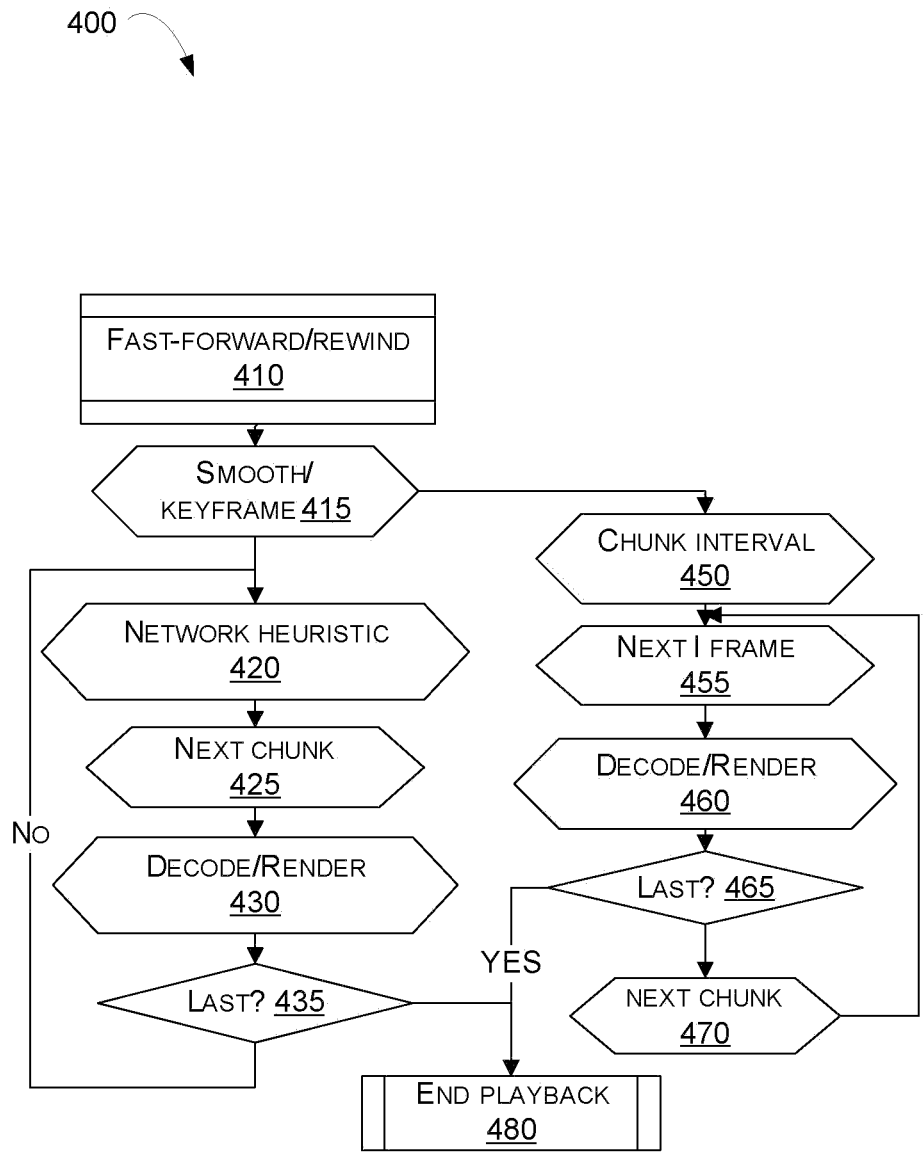
FIG. 4 shows a process flow depicting an embodiment of a method for media streaming with a smooth fast-forward and rewind.

FIG. 4 shows a process flow depicting an example embodiment of a method 400 using both a smooth fast-forward and rewind and a key-frame mode when playback performance would not otherwise support a smooth fast-forward or rewind bit-rate. In the current example chunk based streaming embodiment, a playback device may continue monitoring network bandwidth, so that when a user issue a fast-forward/rewind command 410, the playback device can use method 400 to determine which chunks to downloaded to provide either a smooth fast-forward rewind or to transition to a key-frame download according to heuristics monitoring playback performance. The process flow in FIG. 4 depicts an example monitoring network heuristics, but playback device heuristics may also be used or even used in conjunction with network heuristics. Method 400 describes a joint smooth and key-frame approach for illustration purposes, other embodiments are not so limited.

In block 415, method 400 may evaluate playback performance and determine whether to enter a key-frame mode or use smooth playback according to current forwarding/rewinding speed. If a forwarding/rewinding speed is higher than a certain threshold, for example if the threshold speed where a client can support a smooth playback speed, a playback device may enter key-frame mode. In some embodiments, the threshold may be decided by the capability of a media pipeline, by the decoding capability of a playback device, by an appropriate predefined threshold, or by other suitable thresholds.

In this example, if a forwarding/rewinding speed is lower than an allowable smooth playback speed, the playback device may compare the forwarding/rewinding speed with the download speed. In this way, if the speed is higher than an allowable download speed, the playback device may enter key-frame mode, otherwise, the playback device will enter smooth playback mode. For example, the bandwidth can be the allowable client network bandwidth or it may be set to a threshold MBR bit rate to prevent fast-forwarding/rewinding from using too much server bandwidth. After determining which mode to use in block 415, key-frame or smooth, a playback device can use the following logic to determine which chunks to be downloaded during fast-forwarding/rewinding.

In response to determining a smooth fast-forward or rewind is supported in block 415, method 400 allows a playback device to download complete media stream chunks with continuous timestamp. In block 420, a supported bit rate may be determined by network heuristics by considering available bandwidth, buffer information (such as buffer fullness, fill rate, etc.), media stream quality, etc., to determine a supported bit rate to select the next chunk 425 while supporting smooth fast-forward and rewind.

In one example, an embodiment may monitor playback speed and the ratio of B-frames to overall frames, and the playback device can decide whether or not to download, decode, or render B-frames in block 430. To continue this example, if playback speed >2 and the ratio of B-frames is <50% of all frames, method 400 may direct a playback device to drop all B frames and still achieve a high frame rate for smooth fast-forward or rewind. Then, in block 435 method 400 can determine if a last chunk is received, if not, method 400 loops back to network heuristic block 420, and if the last chunk is received, method 400 proceeds to block 480.

On the other hand, if in block 415 a smooth mode is not supported, method 400 proceeds to block 450. In key-frame fast-forward or rewind mode, a playback device will download a key-frame for each chunk without downloading a complete chunk. In the current example, in block 450 the method 400 determines if a chunk interval is to be applied. For example, a playback device or network connection may not support a full key-frame mode and may skip chunks once a playback speed exceeds a certain threshold.

Method 400 then proceeds to block 455 and retrieves the next key-frame, or I-frame, and decodes and renders the key-frame in block 460. Then, method 400 proceeds to block 465 to determine if the decoded key-frame is the key-frame for the last chunk to download, and if so proceeds to block 480 and ends playback. If the key-frame received in block 465 was not for the last chunk, method 400 proceeds to the next chunk in block 470 and loops to before block 455 to retrieve the next key-frame (I-frame) for the subsequent chunk.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" and "playback device" as used herein includes devices that electronically execute one or more programs, including, but not limited to, media players and any other suitable devices such as personal computers, servers, laptop computers, hand-held devices, cellular phones, microprocessor-based programmable consumer electronics and/or appliances, and other computer networking devices comprising hardware or software suitable for playing streaming media.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of rendering a media stream to provide a smooth fast-forward or rewind, the method comprising, at a playback device:
   receiving a media stream encoded at a first bit rate over a network connection;
   dynamically monitoring playback performance of the playback device;
   sending information from the playback device related to the playback performance of the playback device to a remote server via the network connection, the information indicating to the server whether the performance of the playback device supports smooth fast-forward or rewind playback;
   receiving the media stream based on the information;
   receiving an input to fast-forward or rewind the media stream;
   if the information indicates that the playback device supports smooth fast-forward or rewind playback, retrieving the media stream at a second bit rate; and
   rendering the media stream at the second bit rate for smooth fast-forward or rewind playback.

2. The method of claim 1, further comprising:
   ramping the second bit rate of the media stream to an intermediate bit rate; and
   rendering the media stream at the intermediate bit rate for smooth fast-forward or rewind playback.

3. The method of claim 1, further comprising:
   monitoring performance of the network connection;
   receiving an input for a fast-forward or rewind playback speed; and
   rendering the media stream for smooth fast-forward or rewind playback at the playback speed at a bit rate supported by the network connection.

4. The method of claim 1, further comprising:
   rendering a portion of frames in the media stream for fast-forward or rewind playback at a third bit rate if the performance of the playback device does not support smooth fast-forward or rewind playback at the second bit rate.

5. The method of claim 1, wherein the media stream is encoded in a plurality of independently decodable chunks in at least the first bit rate and the second bit rate.

6. The method of claim 5, wherein each of the plurality of independently decodable chunks have a similar playback duration.

7. The method of claim 5, further comprising rendering a portion of the plurality of independently decodable chunks in the media stream at the second bit rate for smooth fast-forward or rewind playback.

8. The method of claim 1, further comprising:
   setting a download bandwidth threshold on the media stream; and
   retrieving the media stream at or below the download bandwidth threshold.

9. A method for providing a media stream from a media server for smooth fast-forward or rewind on a playback device, the method comprising:
   encoding a media stream at a plurality of bit rates, the plurality of bit rates including a first bit rate and a second bit rate;
   sending the media stream at the first bit rate to the playback device over a network connection;
   receiving information from a playback device related to performance of the playback device, the information being based upon dynamic monitoring of playback performance of the playback device, the information being used to determine whether the performance of the playback device supports smooth fast-forward or rewind playback;
   sending the media stream to the playback device over the network connection based on the information;
   in response to a fast-forward or rewind input, sending the media stream encoded at the second bit rate to the playback device to be rendered at the second bit rate for smooth fast-forward or rewind playback if the performance of the playback device supports smooth fast-forward or rewind playback.

10. The method of claim 9, further comprising:
    ramping the second bit rate of the media stream to an intermediate bit rate; and
    sending the media stream to the playback device at the intermediate bit rate for smooth fast-forward or rewind playback.

11. The method of claim 9, further comprising:
    receiving information from the playback device related to performance of the network connection;
    receiving an input from the playback device for a fast-forward or rewind playback speed; and
    sending the media stream to the playback device for rendering smooth fast-forward or rewind playback at the playback speed at a bit rate supported by the network connection.

12. The method of claim 11, wherein if the performance of the network connection or the performance of the playback device does not support a smooth fast-forward or rewind at the second bit rate, the method further comprising sending a portion of frames in the media stream to the playback device.

13. The method of claim 9, wherein the media stream is encoded in a plurality of independently decodable chunks in at least the first bit rate and the second bit rate.

14. The method of claim 13, wherein each of the plurality of chunks have a similar playback duration.

15. The method of claim 13, further comprising sending a portion of the plurality of chunks in the media stream to the playback device for smooth fast-forward or rewind playback.

16. The method of claim 9, further comprising:
setting a download bandwidth threshold on the media stream; and
sending the media stream to the playback device at or below the download bandwidth threshold.

17. A computing device to provide a smooth fast-forward or rewind of a media stream, comprising:
an index file containing attributes of a plurality of media chunks encoded at a plurality of bit rates including a first bit rate and a second bit rate, each media chunk having a similar playback duration;
a network module to receive a media stream encoded at the first bit rate over a network connection from a server;
a heuristics module configured to dynamically monitor playback performance of the computing device;
a platform module to send information related to the playback performance to the server, to receive the media stream from the network module based on the information, and in response to a fast-forward or rewind input for the media stream, the platform module to retrieve the media stream encoded at a second bit rate and to render the media stream for smooth fast-forward or rewind playback at the second bit rate.

18. The computing device of claim 17, wherein the platform module is configured to ramp the second bit rate of the media stream to an intermediate bit rate, and render the media stream at the intermediate bit rate for smooth fast-forward or rewind playback.

19. The computing device of claim 17, wherein information related to the playback performance comprises at least one of a receive buffer fullness, network bandwidth, computing device bandwidth, or media stream quality, wherein the platform module is configured to render the media stream for smooth fast-forward or rewind playback at a supported bit rate in the index file in response to a command from the heuristics module.

20. The computing device of claim 19, wherein if the playback performance does not support a smooth fast-forward or rewind at a bit rate, the platform module is configured to retrieve a portion of frames in the media stream and to render the media stream for smooth fast-forward or rewind playback.

* * * * *